(12) United States Patent
Kimberlin

(10) Patent No.: US 6,244,196 B1
(45) Date of Patent: *Jun. 12, 2001

(54) APPARATUS AND METHOD FOR BURNING ORGANIC MATERIAL

(76) Inventor: John Kimberlin, 3338 Ute Ave., Waukee, IA (US) 50263

(*) Notice: Subject to any disclaimer, the term of this patent is extended or adjusted under 35 U.S.C. 154(b) by 0 days.

This patent is subject to a terminal disclaimer.

(21) Appl. No.: 09/155,658
(22) PCT Filed: Apr. 2, 1997
(86) PCT No.: PCT/US97/05564
 § 371 Date: Oct. 1, 1998
 § 102(e) Date: Oct. 1, 1998
(87) PCT Pub. No.: WO97/37171
 PCT Pub. Date: Oct. 9, 1997

Related U.S. Application Data (63) Continuation-in-part of application No. 08/626,761, filed on Apr. 2, 1996, now Pat. No. 5,839,375.

(51) Int. Cl.[7] .............................. F23M 5/00; F23H 3/08; F23G 5/00
(52) U.S. Cl. .................. 110/317; 110/196; 110/235; 126/109; 126/224; 165/109.1
(58) Field of Search .................... 110/196, 233, 110/235, 241, 242, 251, 252, 253, 254, 297, 317; 165/109.1, 179; 126/70, 71, 109, 224; 138/38

(56) References Cited

U.S. PATENT DOCUMENTS

| 393,540 | * | 11/1888 | Coleman . | |
|---|---|---|---|---|
| 600,910 | * | 3/1898 | Elmendorf . | |
| 1,459,024 | * | 6/1923 | Hartburg . | |
| 1,566,608 | | 12/1925 | Kruse . | |
| 1,672,617 | * | 6/1928 | Lasker . | |
| 2,077,776 | * | 4/1937 | Schmitt . | |
| 2,079,104 | * | 5/1937 | Brandt | 165/179 X |
| 2,326,716 | * | 8/1943 | Wood . | |
| 2,565,879 | * | 8/1951 | Perle . | |
| 3,664,278 | * | 5/1972 | Steen . | |
| 4,215,743 | | 8/1980 | Margittai | 165/141 |
| 4,218,980 | * | 8/1980 | Probsteder | 110/196 |
| 4,641,705 | * | 2/1987 | Gorman | 165/109.1 X |
| 4,869,230 | * | 9/1989 | Fletcher et al. | 138/38 X |
| 5,497,824 | * | 3/1996 | Rouf | 165/109.1 |
| 5,839,375 | * | 11/1998 | Kimberlin | 110/235 |

FOREIGN PATENT DOCUMENTS

| 2 317 441 | 10/1974 | (DE) . | |
|---|---|---|---|
| 73 11245 | 11/1973 | (FR) | F23G/5/12 |
| 2 059 560 | 4/1981 | (GB) | F23G/3/00 |

\* cited by examiner

Primary Examiner—Ira S. Lazarus
Assistant Examiner—Ljiljana V. Ciric
(74) Attorney, Agent, or Firm—Zarley, McKee, Thomte, Voorhees & Sease

(57) ABSTRACT

An apparatus and method for burning organic material including farm bedding waste of the present invention includes a firebox having an air injector disposed within the firebox. A heat exchanger is also disposed within the firebox above the air injector. The fuel to be burned, a mixture of organic farm bedding waste, is piled in the firebox surrounding the air injector and heat exchanger. By injecting air into the pile of fuel, the fuel is burned from the inside out, surrounding the heat exchanger with the burning fuel. The unburned fuel acts to insulate the burning fuel from the walls of the firebox.

2 Claims, 10 Drawing Sheets

APPARATUS AND METHOD FOR BURNING ORGANIC MATERIAL

Reference To Related Applications: this application is related under 35 U.S.C. § 119 to PCT/US97/05564, filed Apr. 2, 1996, which in turn, is a continuation-in-part of U.S. Ser. No. 08/626,761, filed Apr. 2, 1996, now U.S. Pat. No. 5,839,375.

BACKGROUND OF THE INVENTION

1. Field of the Invention

The present invention relates to organic waste disposal. More particularly, though not exclusively, the present invention relates to an apparatus and method for burning organic material including farm bedding waste.

2. Problems in the Art

A significant problem exists in the livestock field with the removal and disposal of animal manure and bedding. For example, a farmer or horse trainer will typically bed a livestock stall by periodically spreading 6–8 inches of bedding material over the floor of the stall. The bedding and animal waste is then periodically removed from the stall and piled outside of the barn. The cost of animal waste and bedding removal and disposal is significant. For example, at the three week All American Quarter Horse Congress in Columbus, Ohio, approximately 2.7 million cubic feet of manure must be removed and disposed of each year. This results in a cost of over $200,000.00 per year to dispose of the waste. Both small and large operations experience the same problems with waste removal and disposal.

The most common prior art method of disposing of animal waste is by spreading the manure over a field. Spreading manure over a field has several disadvantages. First, the hauling costs and time required are high. Also, the manure increases the acidity of the soil in the field. Other problems in the field can occur from weed seeds in the manure. Weed seeds from either the animal bedding or feed will be present in manure and will contaminate the field with unwanted weeds. Finally, the manure will host a number of unwanted parasites and disease carrying bacteria which can harm farm animals or cause farm animals to get diseases such as sleeping sickness, for example.

It is also becoming more common to dispose of animal waste at local landfills which are already near their capacities.

There are systems for burning organic animal waste to dispose of such waste. The most common is simply burning a pile of waste. Since animal bedding waste burns like a silage fire, the pile of manure will burn slowly and will smolder for months. Also, a pile of animal waste will burn at a relatively low heat which causes undesirable odors. Burning this waste material in a fireplace or furnace also has undesirable results. First, the waste must be dry before it will burn in a fireplace or furnace. Second, when the waste does burn, it does so slowly and inefficiently.

Another problem found in the livestock field is the high expense of heating farm buildings such as horse barns or indoor arenas used for training horses. If a farmer needs to heat a farm building the cost is quite high using conventional furnaces or heating methods. In addition, these furnaces or methods usually burn fossil fuels or use electricity which is generated using primarily fossil fuels. Burning fossil fuels is expensive and pollutes the air. For example, to heat a typical 15 stall horse barn located in the Midwest may cost the farmer $1,500 or more per year. A typical prior art wood or coal burning furnace for heating a farm building is also expensive and complex. A typical wood burning furnace will have a fire box encasing the fuel to be burned. Since the walls of the wood burning furnace are directly exposed to the burning fuel, the structure of the furnace must withstand this extreme heat. Also, the outer walls of the furnace will become extremely hot which creates a hazardous situation for people and animals working near the furnace, especially children.

It can therefore be seen that there is a need for an effective way to dispose of organic farm bedding waste and also for a more effective and more economical method of heating a farm building.

FEATURES OF THE INVENTION

A general feature of the present invention is the provision of an apparatus and method for disposing of organic farm bedding waste which overcomes the deficiencies found in the prior art.

Another general feature of the present invention is the provision of an apparatus and method for burning organic material which overcomes deficiencies found in the prior art.

A further feature of the present invention is the provision of an apparatus and method for disposing of organic farm bedding waste which injects air into the waste causing the waste material to burn from the inside out creating a chamber within the waste which substantially surrounds a heat exchanger resulting in an effective and efficient apparatus and method.

Further features and advantages of the present invention include:

An apparatus and method for burning organic farm bedding waste which burns the waste from the inside out allowing the unburned waste to insulate the walls of the furnace from the fire.

An apparatus and method for burning organic farm bedding waste which provides an effective method of disposing of the waste as well as a means for economically heating a building.

An apparatus and method for burning organic farm bedding waste which allows the user to put wet organic farm bedding waste into the apparatus.

An apparatus and method for burning organic farm bedding waste which reduces fossil fuel consumption and pollution.

These as well as other objects, features and advantages of the present invention will become apparent from the following specification and claims.

SUMMARY OF THE INVENTION

The present invention relates to a method and apparatus for burning organic materials including farm bedding waste. An air injector is provided near the bottom of a combustion space with a heat exchanger located near the air injector. A fuel mixture to be burned is piled over the heat exchanger and air injector. Oxygen is then injected into the pile of fuel causing the fuel to burn from the inside out substantially surrounding the heat exchanger with burning fuel. The invention may optionally be used to heat a building.

DETAILED DESCRIPTION OF THE PREFERRED EMBODIMENT

The present invention will be described as it applies to its preferred embodiment. It is not intended that the present invention be limited to the described embodiment. It is intended that the invention cover all alternatives, modifications, and equivalences which may be included within the spirit and scope of the invention.

Figures 1, 5:
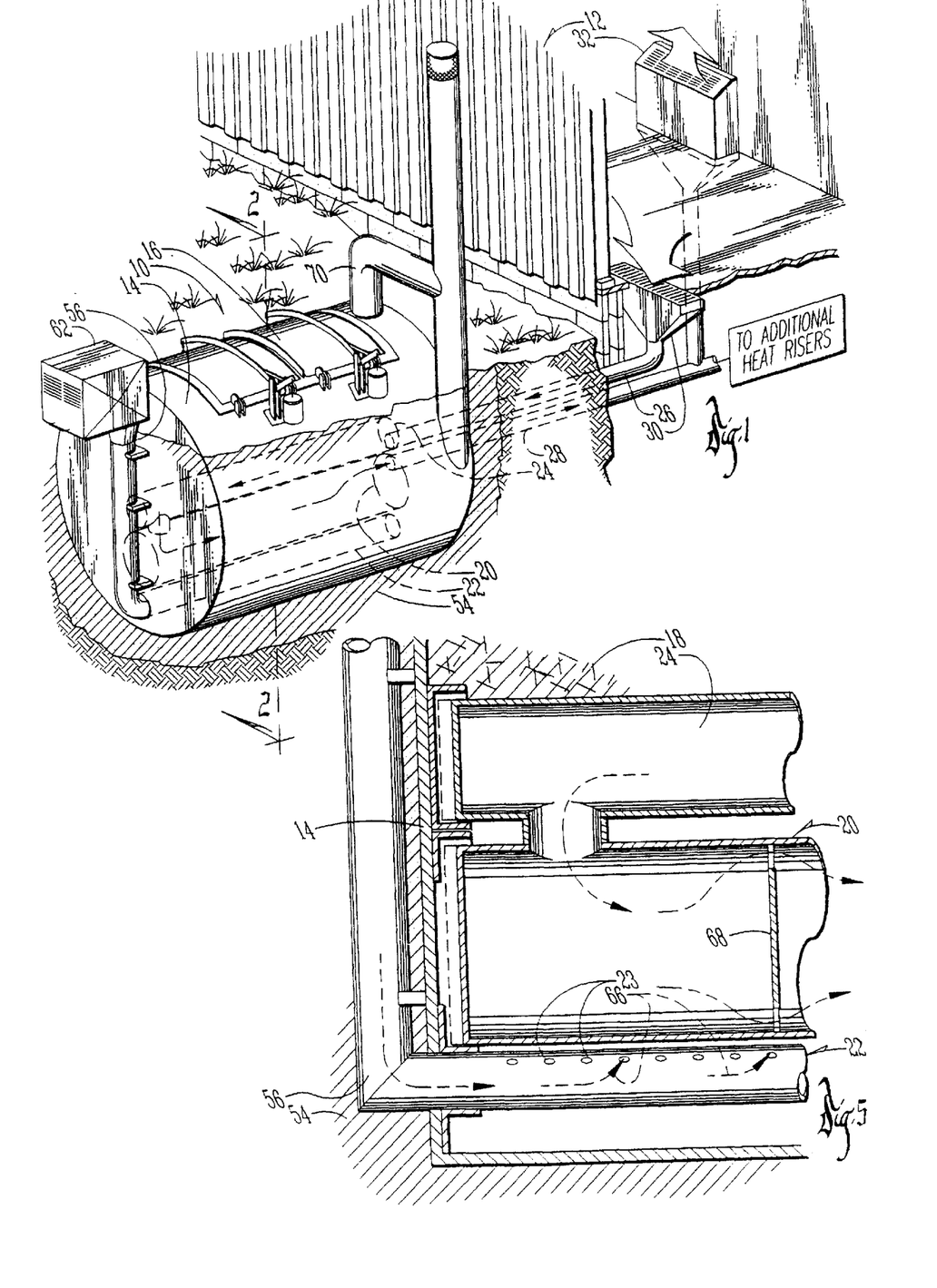
FIG. 1 is a perspective view of an embodiment of the present invention being used to heat a building.
FIG. 5 is an enlarged partial cross section taken along lines 5—5 of FIG. 2.

FIG. 1 shows an apparatus for burning organic farm bedding waste of the present invention. FIG. 1 includes a furnace 10 buried partially in the ground next to a building 12. FIGS. 2–5 show the furnace 10 in more detail. The furnace 10 includes a cylindrical fire box 14 having two ends. The firebox 14 is preferably made from thick iron. A door 16 is disposed on top of the fire box 14 and opens and closes about hinges 16A. A heat exchanger 20 is located within the firebox. Having the heat exchanger 20 within the firebox 14 is advantageous. With the door 16 open, a quantity of fuel 18 can be dumped into the fire box 14 surrounding the heat exchanger 20, an air injector pipe 22, and a cold air pipe 24. The cold air pipe 24 is connected to a cold air return 26 which is ultimately connected to a cold air return input 30 located within the building 12. The heat exchanger 20 is connected to a hot air pipe 28 which carries hot air from the heat exchanger 20 to a register 32 located within the building 12. The register 32 includes a fan for circulating the air from the heat exchanger 20 through the building 12 and back through the cold air return input 30 to the heat exchanger 20. In this way, the cold air within building 12 enters the cold air return input 30, is heated by the heat exchanger 20, and is circulated back into the building 12 through the register 32.

The present invention is used to burn organic farm bedding waste and the like. The waste could be comprised of various suitable materials. In one example, the farm bedding waste is comprised of animal waste mixed with sawdust which is used to bed the animals' stalls. This mixture is mixed in the animal stalls simply by the animals walking through the stalls. Alternatively, the materials could be mixed elsewhere or even within the furnace. It was discovered that certain types of organic waste will burn in a very unusual and unexpected way if subjected to the right conditions. It was also discovered that injecting oxygen into a pile of smoldering waste causes the fuel to burn in the unusual and unexpected way.

Figure 6:
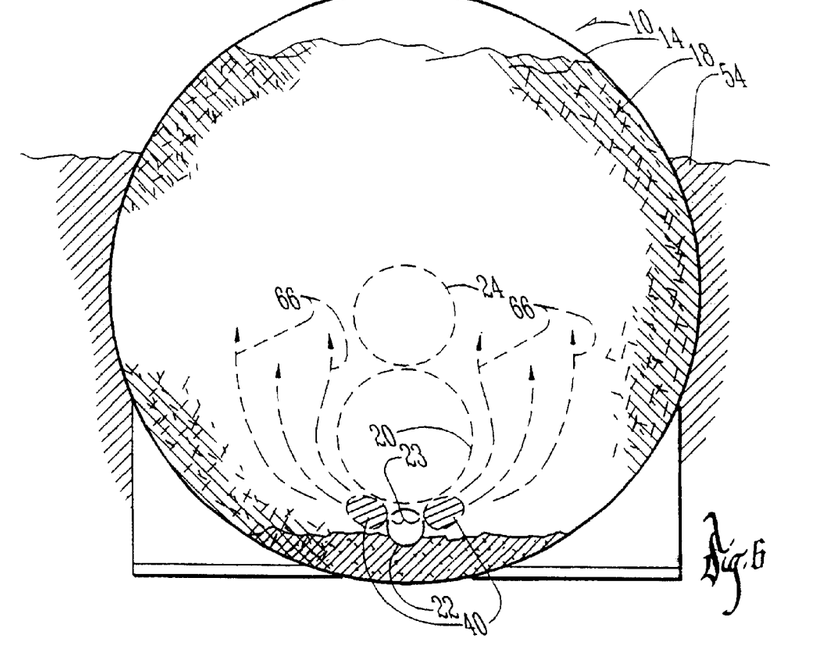
FIGS. 6–13 are cross sections similar to FIGS. 3 and 4 showing various stages of burning using the present invention.

FIGS. 6–13 show various stages of burning fuel used with the present invention. It is believed that FIGS. 6–13 all show cross-sectional views of what it looks like inside the firebox 14 throughout the burning process. The heat exchanger 20 and cold air pipe 24 are shown by the dashed lines. FIG. 6 shows the beginning of the burning cycle after the firebox is filled with the fuel mixture 18 (animal waste and sawdust). Prior to filling the firebox 14 with fuel 18, a layer of about 6 inches is ignited. This could be done using camp fire starter coals or the like. Alternatively, the furnace 10 could include an igniter. Other ways are possible. The fuel 18 is then piled into the firebox 14 as shown in FIG. 6. As oxygen is injected through the air injector pipe 22 into the fuel 18 via the air injector holes 23, the fuel near the holes 23 begins to burn. The holes 23 are located in the air injector pipe 22 such that they guide the injected air into the firebox in the directions shown in the Figures. Other configurations are possible.

FIG. 6 shows the beginning of the burning process. The shaded areas 40 in FIG. 6 show fuel 18 which has started to burn near the air injector holes 23. The arrows 66 shown in the Figures show the escape of exhaust gasses through the fuel 18.

Figure 7:
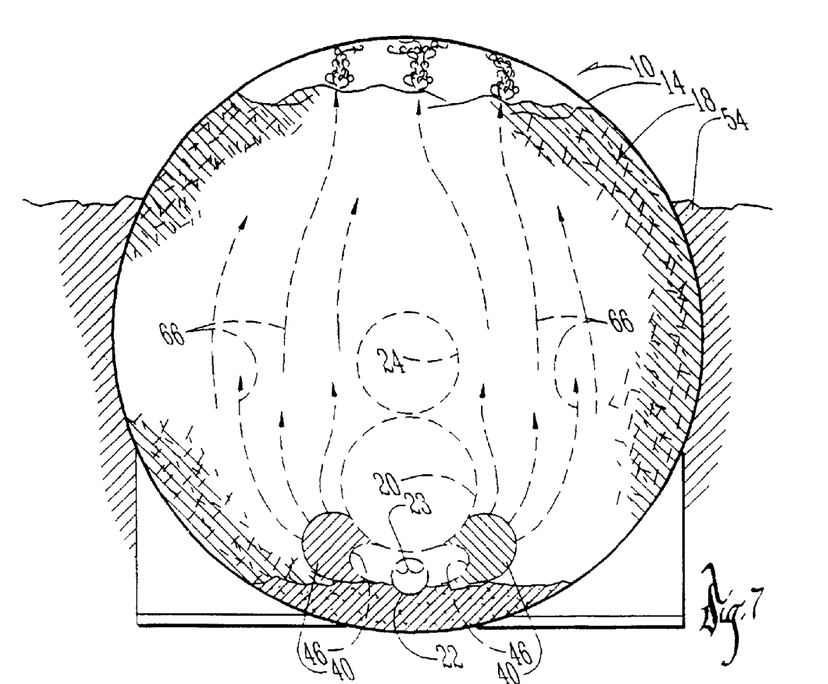

Once the fuel 18 begins to burn, an unusual phenomena takes place. As shown in FIG. 7, as the burning continues, a bridging effect occurs forming a pair of cylindrical burning patterns as shown by the lines 46 in FIG. 7. At this stage, the fuel 18 does not collapse but rather bridges forming a pair of cylindrical voids (like tunnels) in the fuel 18 around the air injector pipe 22. This results in a very concentrated fire with flames emanating from the fuel around the air injector pipe 22. Depending on the uniformity of the fuel and other factors, the bridging may start with secondary bridging occurring at different places along the air injector pipe 22. In other words, at the beginning of the burning process, various pockets may be formed along the air injector pipe 22 before the pair of cylindrical voids are formed as shown in FIG. 7.

Figure 8:
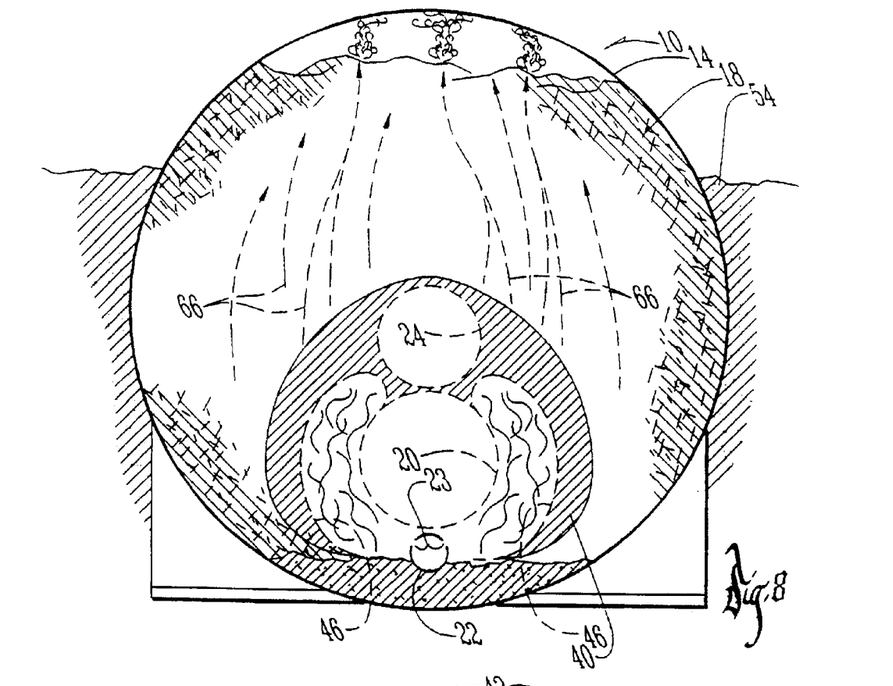

FIG. 8 shows the beginning of the establishment of a cylindrical burn around the heat exchanger shown by lines 46. A layer of fuel 40 is shown burning and producing flames emanating from lines 46 which start to form a pair of kidney-shaped burns around the heat exchanger. Again, the areas enclosed by lines 46 are actually void of fuel or any other material. As shown in FIG. 8, the cylindrical burning has mostly surrounded the heat exchanger 20 and partially surrounds the cold air pipe 24. The cylindrical burning increases as more fuel is burned away.

Figure 9:
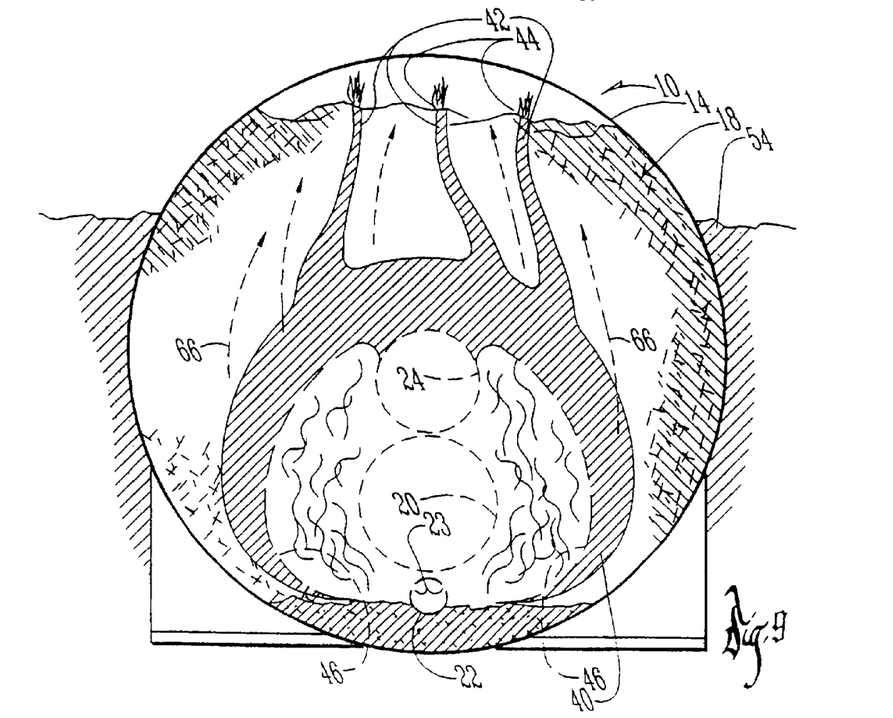

FIG. 9 shows a further stage in the burning process. The flames emanating from lines 46 forming the pair of kidney-shaped burns are now mostly surrounding the cold air pipe 24. At this stage, a full cylindrical burn is almost established.

Figure 10:
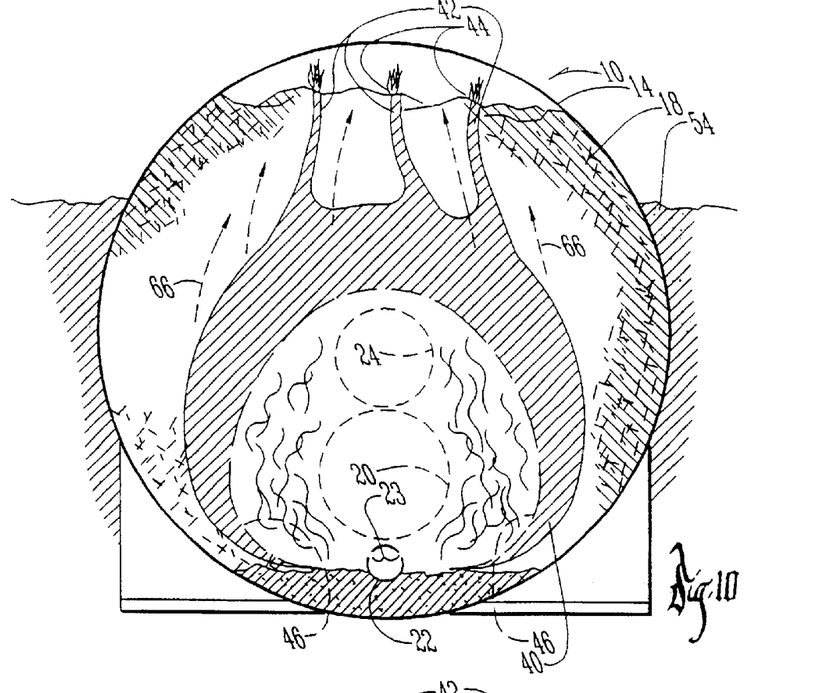

FIG. 10 shows the next stage in the burning process. In this stage, a true cylindrical burn is established shown by lines 46. A layer of fuel 40 is burning and producing flames emanating from line 46 which completely surround the heat exchanger 20 and the cold air pipe 24. During this stage, small air passageways 42 are also formed to release exhaust gases from the flames 40. These air passageways 42 terminate at exhaust port holes 44 formed in the fuel 18. In relation to the flames at line 46, the exhaust port holes 44 are relatively small. The size of the exhaust port holes depends on various factors including the make-up of the fuel and the amount of air injected through the holes 23.

FIG. 10 shows the optimum stage of the present invention (FIGS. 8 and 9 may also be the optimum stage). As shown in FIG. 10, nearly the entire heat produced by the burning fuel 40 is exposed to the heat exchanger and the cold air pipe 24. The remaining fuel 18 which is unburned acts to insulate the heat produced by the flames from the outside walls of the firebox 14. Because of the make-up of the fuel 18, the fuel 18 is a very good thermal insulator. As a result, the exterior of the firebox 14 remains relatively cool while the cylindrical void surrounding the heat exchanger 20 contains nearly all of the heat produced by the flames 40. The firebox 14 will have only a few small hot spots where the exhaust port holes 44 are formed. For example, in FIG. 10, the walls of the firebox 14 will be relatively cool with small hot spots directly above the exhaust port holes 44.

Figure 11:
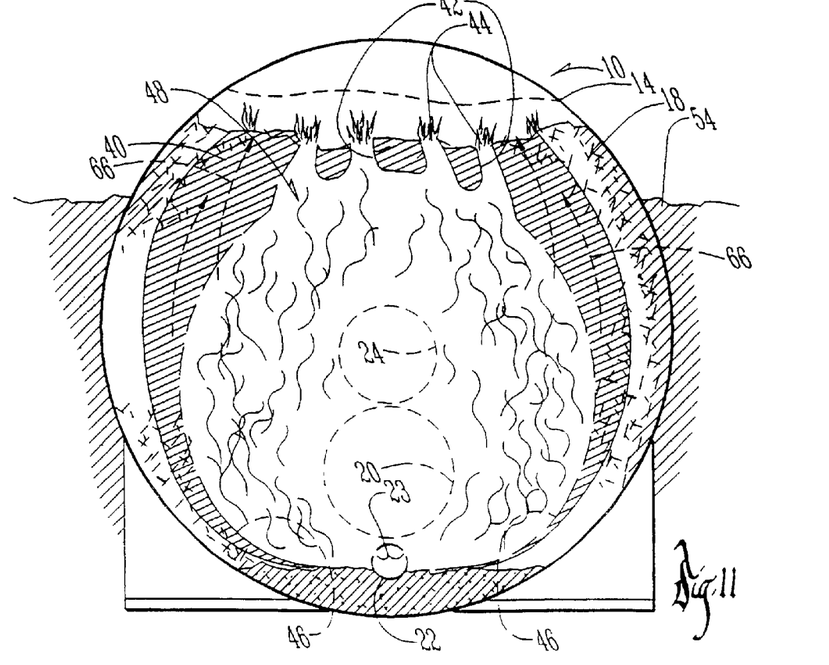

FIG. 11 shows a further stage of burning. As shown in FIG. 11, the bridging of the fuel 18 begins to collapse at this point. While the burning fuel 40 still produces flames emanating from lines 46 in a nearly cylindrical burn surrounding the heat exchanger 20 and the cold air pipe 24, the upper end of the cylinder comprised of fuel 18 starts to become thin and weak.

Figure 12:
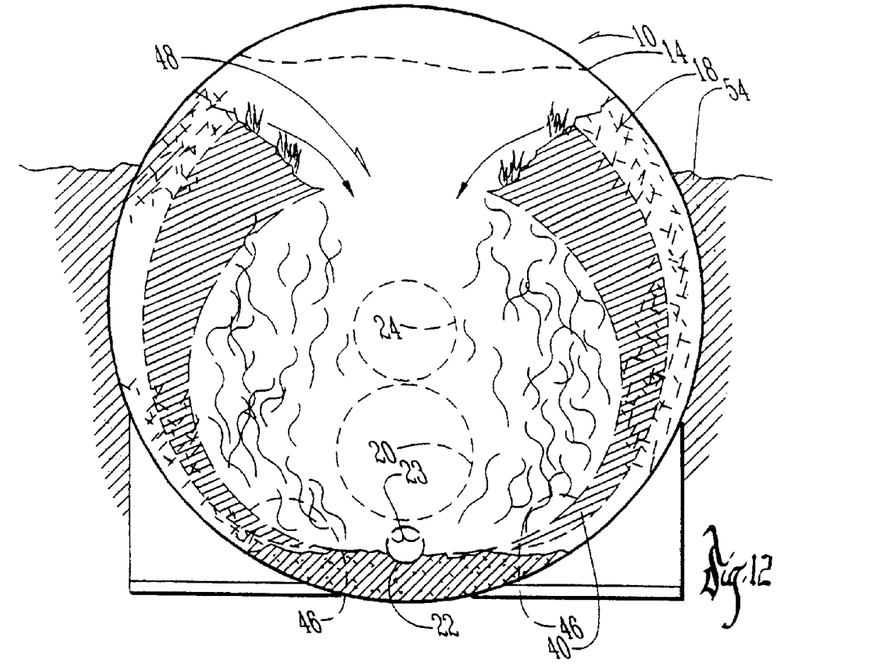

FIG. 12 shows the beginning of a collapse of the cylindrical void. As shown in FIG. 12, the burning fuel 40 is still burning creating flames emanating from lines 46 shaped generally in a cylindrical burn surrounding the heat exchanger 20 and cold air pipe 24, although an opening 48 is formed as the top of the cylinder collapses.

Figure 13:
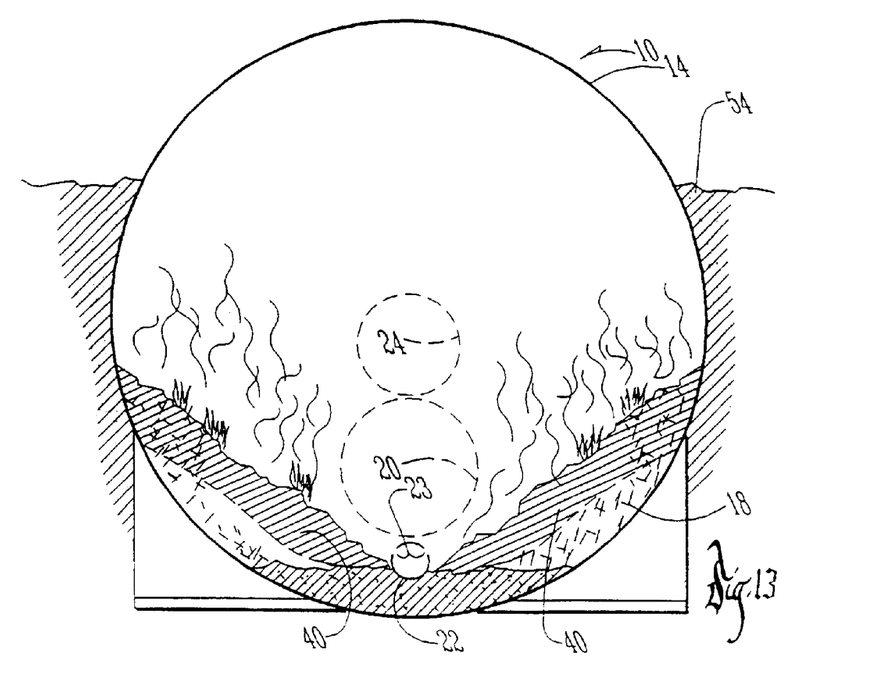

After the collapse, the fuel 18 burns as shown in FIG. 13. FIG. 13 shows unburned fuel 18 lying below burning fuel 40 which still causes flames in the firebox 14, although the flames are no longer completely surrounding the heat exchanger 20.

FIGS. 6–13 show various stages of the burning of the fuel 18 using the furnace 10, although it is preferred that the optimum stage shown in FIG. 10 or 9 is maintained. By gradually adding fuel to the firebox 14, the stage shown in FIG. 10 or 9 can be maintained producing a maximum efficiency.

It is believed that the bridging effect shown in FIGS. 7–12 occurs because of the consistency of the fuel 18. With the appropriate mixture of animal waste and a combustible component, the consistency of the fuel 18 is such that by burning the fuel 18 from the inside, the fuel bridges rather than simply collapsing as it burns. Other fuels do not burn like this, i.e. the prior art does not burn fuel from the inside out. The combustible component could include, for example, sawdust, shredded paper, wood chips, etc. It was discovered that this type of mixture bridges. One example of a fuel 18 consists of a mixture of less than 50% of horse manure and greater than 50% of sawdust, although other ratios and types of bedding or waste produce a similar phenomena. For example, it is believed that certain compositions of hog or chicken waste and other materials may have the appropriate consistency to create the bridging effect. It is possible that waste from all types of animals may be burned in the furnace of the present invention. Also, the combustible material which is mixed with the waste could be any type of combustible material. The make-up of the material used in the furnace could inherently bridge and could be comprised of a by-product of an animal. The structure of the present invention may be valuable in burning all types of materials including manure without bedding, but optimal advantages seem to occur when a mixture of animal waste and a combustible material are used as fuel.

Other types of fuel may work with the present invention, even though some types of fuel may not smolder, therefore requiring an igniter. In addition to creating a bridging effect, the combustible material, for example, sawdust within the animal waste also helps in the burning of the fuel 18. The heat produced by the fuel 18 is believed to come from the burning waste, the burning bedding, and the methane and other gases such as ammonia and nitrous oxides produced by the organic animal waste.

Figure 2:
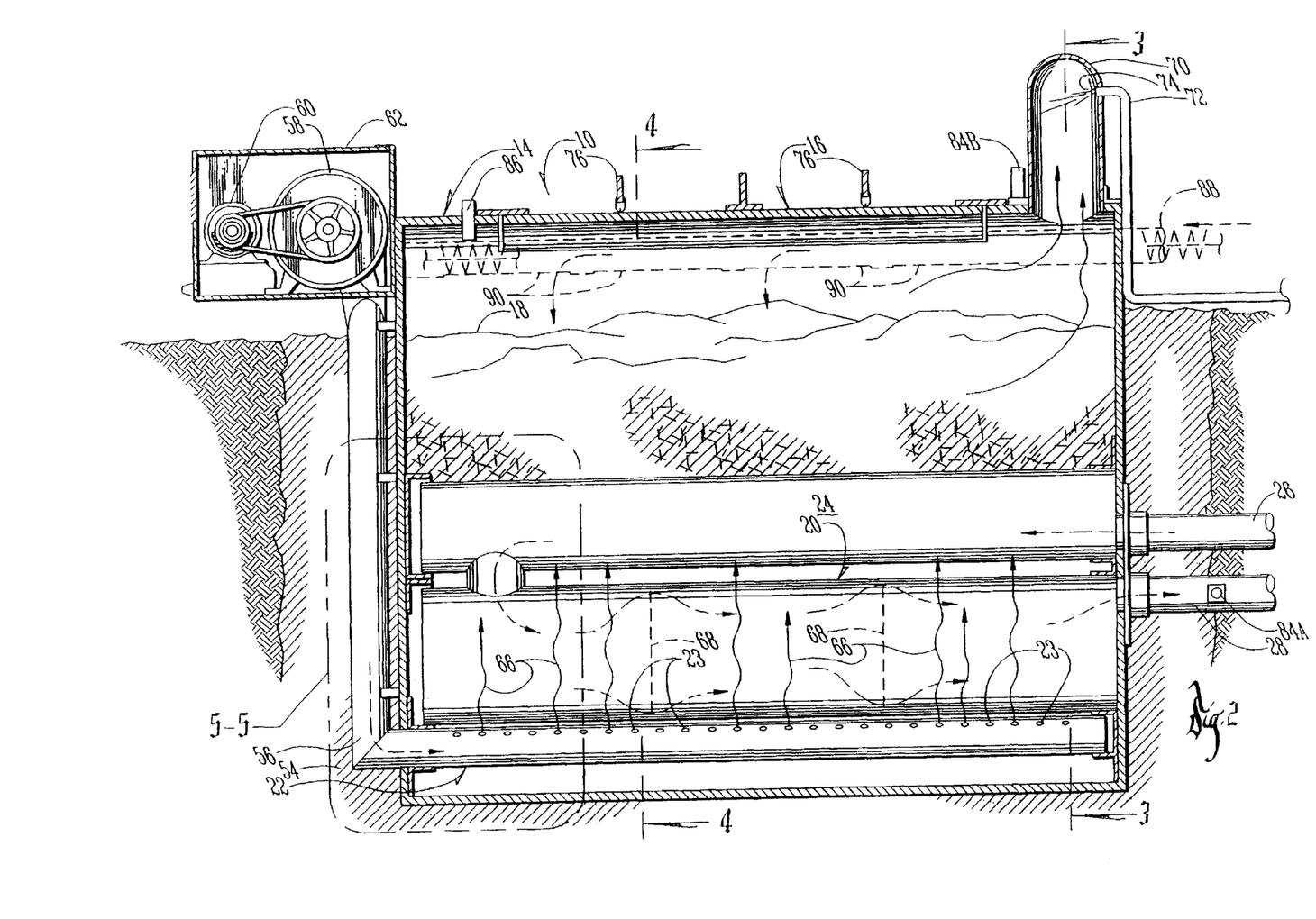
FIG. 2 is an enlarged cross section taken along lines 2—2 of FIG. 1.

FIGS. 2–5 show the furnace 10 in more detail. FIG. 2 is a cross section of the furnace 10 showing the firebox 14 buried partially in a layer of sand 54. The sand functions much like a fire brick in a fireplace and also makes the installation of a furnace easier. The air injected into the firebox 14 through the air injector pipe 22 comes through an air tube 56 which is connected to a squirrel cage fan 58 connected to a motor 60 enclosed in a housing 62. When the fan 58 is turned on, air is forced through the air tube 56 and the air injector pipe 22 through the holes 23. This causes the air to flow generally in the directions shown by arrows 66 in the figures. Air blown in these directions cause the desired burning as described above and shown in FIGS. 9–13.

The heat exchanger 20 includes a number of baffles 68 (FIG. 3) used to cause the air to move through the heat exchanger 20 as shown by the dashed lines in FIGS. 2 and 5. This increases the efficiency of the heat exchanger 20, but are not essential. While the size of the heat exchanger can vary, the heat exchanger is preferably not so big (relative to the firebox) that the appropriate bridging does not occur.

The exhaust gases created by the burning fuel escape through the air passageways 42 and ultimately escape through a chimney 70. The furnace 10 may include a source of water 72 connected to a nozzle 74 which sprays a fan of water into the chimney 70 perpendicular to the length of the chimney 70. This is shown best in FIGS. 2 and 3. The purpose of the fan of water is to cause any ashes or debris rising through the chimney to fall back into the firebox 14. This results in a cleaner burning furnace 10 and reduces the risk of catching nearby objects on fire. If the furnace 10 is used in areas requiring strict pollution guidelines, conventional scrubbers or other emissions processing equipment may be installed.

Figure 3:
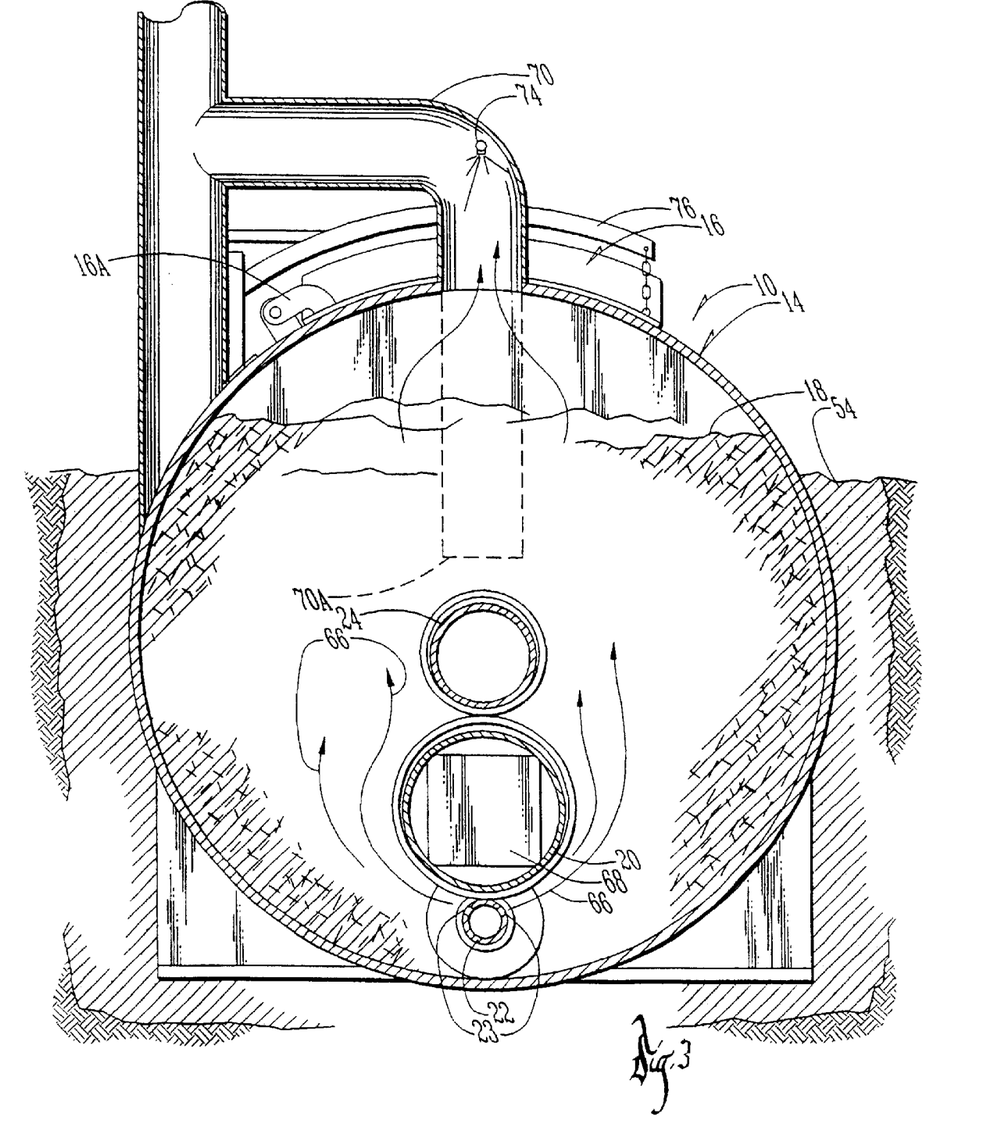
FIG. 3 is a cross section taken along lines 3—3 in FIG. 2.

An alternative chimney 70 includes a chimney inlet tube 70A which extends down into the firebox 14 as shown by dashed lines in FIG. 3. It is believed that a chimney with a chimney inlet 70A will cause the fuel 18 to burn more efficiently. The chimney inlet 70A will cause the exhaust gases to exit the firebox 14 near the cylindrical burn so that the gases will not have to travel through the fuel to escape. This will reduce or eliminate the air passageways 42 and the exhaust port holes 44 eliminating the hot spots on the firebox walls and increasing the efficiency of the furnace 10. The chimney inlet 70A may also improve the burning of very wet fuel by helping the bridging effect. The chimney inlet 70A may be comprised of a solid metal tube or a wire mesh, for example. The chimney inlet 70A may also be detachable from the chimney 70 or adjustable in length.

Figure 4:
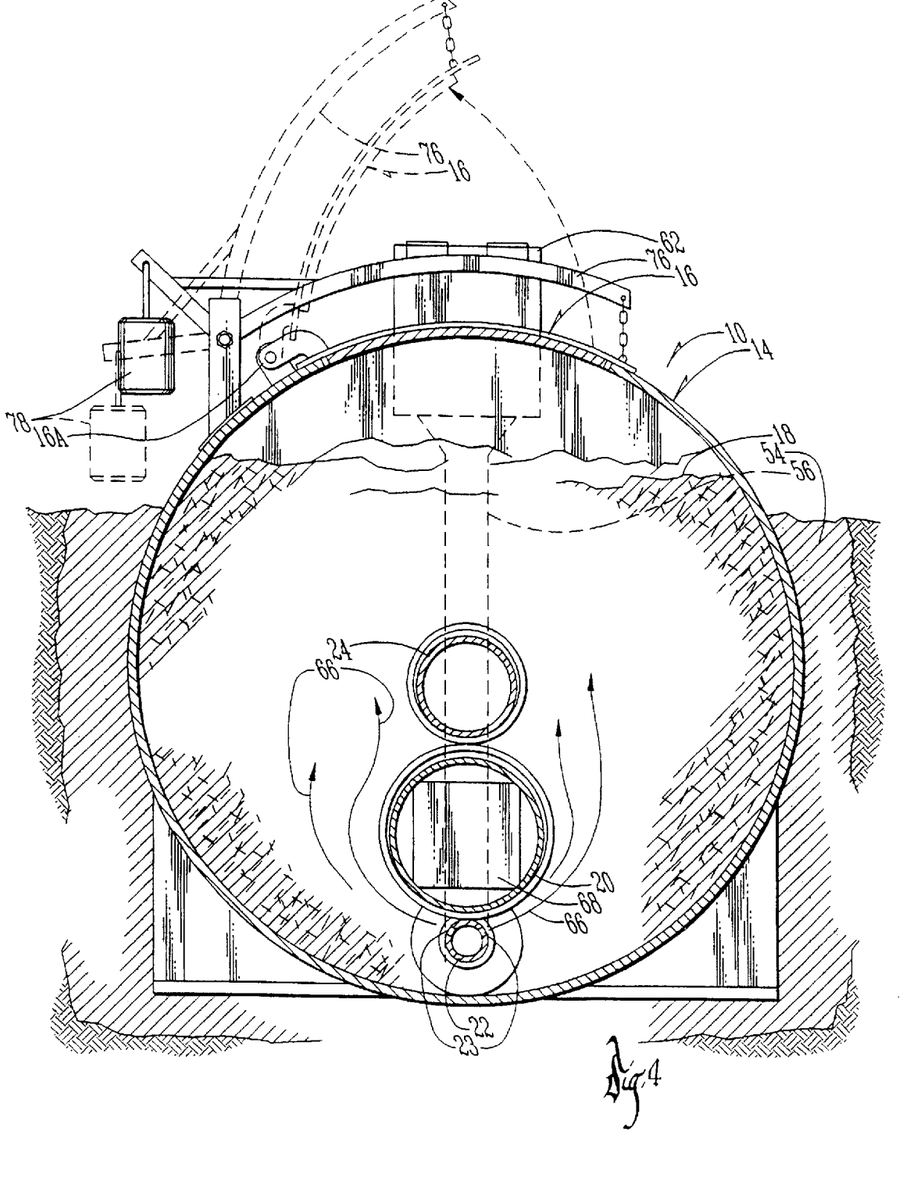
FIG. 4 is a cross section taken along lines 4—4 in FIG. 2.

FIG. 4 shows a view of the door 16 in the closed (solid lines) and open (dashed lines) positions. The door 16 is coupled to a pair of door support arms 76 which pivot upward. When the door support members 76 are raised upward, the door 16 raises along with them. A set of counter-weights 78 may be included to hold the door 16 in the open position for loading more fuel 18 into the firebox 14. For applications requiring a low amount of heat, a set of door springs could be used in place of the counter-weights 78.

When no oxygen is provided to the fuel 18 by the air injector holes 23, the preferred fuel goes into a dormant, sleep-like state and slowly smolders much like a silage fire. For example, the fuel 18 enclosed in the firebox 14 may smolder for months without completely burning up if no additional oxygen is injected into the firebox 14. The present invention takes advantage of this property to control the amount of heat put out by the furnace 10. When no additional heat is required, the fan 58 is turned off which stops the flow of oxygen through the air injector pipe holes 23 causing the fuel 18 to go into the dormant, smoldering state. When additional heat is desired, the fan 58 is activated which causes the fuel 18 to start burning almost instantaneously. As a result of this property, the burning stage shown in FIG. 9 (or any other stage) can be turned on and off as heat is needed. While the fan circulating the air through the cold air return pipe 26 and the hot air pipe 28 will preferably remain activated continuously, the fan 58 will only be activated when additional heat is required. A thermostat located within the building 12 will cause fan 58 to turn on when the temperature drops below the threshold set by a user. Once the temperature rises above a threshold, the fan 58 stops causing the fuel 18 to go back to the dormant state.

As an optional safety measure, a pair of upper limit controls 84A and 84B are included. The first upper limit control 84A is located down stream from the heat exchanger 20, shown in the hot air pipe 28 in FIG. 2. When the upper limit control 84A indicates that the air temperature in the air pipe 28 exceeds a certain temperature (e.g. 200° F.) the fan 58 will be shut down reducing the amount of heat produced, regardless of the thermostat. The protects the ductwork and the heat register from excess heat. Similarly, the upper limit control 84B senses the temperature within the firebox 14 and shuts down the fan 58 if the temperature within the firebox 14 exceeds a certain level (e.g. 800° F.). The first upper limit control 84A may be located in several locations, including within the building 12.

Another optional safety device is the door kill switch 86 shown in FIG. 2. When the door 16 is opened, the kill switch 86 is activated causing the fan 58 to turn off. This reduces the heat within the firebox to reduce potential injury to a user who opens up the door 16 to the firebox 14.

FIG. 2 also shows an optional feature of the invention. To automate the filling of the firebox 14, an auger 88 may be included. The auger 88 is preferably comprised of a stainless steel tube and flighting. The auger 88 extends across the whole length of the firebox 14. The opposite end of the auger 88 (not shown) terminates at a source of fuel 18 and moves fuel from the source of fuel into the firebox 14. A number of holes 90 are formed in the tube of the auger 88. The fuel 18 will fall through the holes as the flighting of the auger moves the fuel past the holes.

Another optional feature of the invention involves collecting methane gas from a long-term waste storage area. The collected methane could then be injected into the furnace 10 with the air through the air injector pipe 22. This would increase the heat generated and reduce the amount of methane and other inert gases released into the atmosphere.

Although the present invention has many applications, the preferred use of the furnace 10 is for heating a horse or livestock barn or an indoor arena. It is believed that a typical 15-stall horse barn will provide enough fuel for the furnace 10 to heat the horse barn for a period of about 4 months, which covers a typical winter. This saves the farmer the cost of manure disposal plus the cost of heating the barn.

For the purposes of this description, the term "heat exchanger" includes any device for drawing heat from one place to another place. For example, the heat exchanger 20 could include a boiler or a device for changing heat into mechanical energy. It is believed that the furnace 10 could be configured to power a steam turbine or the like to generate electricity. The furnace 10 could also be used simply as an incinerator. The furnace 10 could also power an air conditioner.

While the present invention would operate sufficiently using components of various dimensions, the dimensions are as follows. The firebox 14 is 8 feet in diameter and approximately 10 feet long. The heat exchanger 20 is 24 inches in diameter while the cold air pipe 24 is 18 inches in diameter. The pipes 26 and 28 are 15 inches in diameter. The firebox and the components within the firebox are preferably comprised of heavy steel. However, other materials may be used such as composite materials which are lighter, stronger, or have better heat withstanding properties. The firebox 14 and various components could also be comprised of a lighter iron material lined with a liner material providing a heat resistant coating on the inside and/or outside surfaces. Using a heat resistant coating may cut the weight of the furnace 10 in half while still being able to withstand temperatures up to 4,000° F. The pipe 28 is preferably comprised of steel near the firebox 14, but could change to a lighter steel further downstream from the firebox 14. The preferred exhaust system is shown as chimney 70, although it would be possible to include an exhaust system that recirculates the exhaust to improve the efficiency of the furnace 10. The preferred fuel could also be created by mixing sawdust or another material with animal waste if the animal waste to be disposed contains no bedding material, for example.

The furnace 10 of the present invention also burns cleanly. While heating a barn or other building with a conventional heater (burning fossil fuels) causes a significant amount of air pollution in the form of carbon monoxide, etc., burning fuel comprised of organic farm bedding waste produces mainly carbon dioxide and water vapor. While the production of carbon dioxide may seem undesirable, the same amount of carbon dioxide is released by organic waste decomposing naturally as is given off by burning it, just at different rates. As a result, the net pollution caused by the furnace 10 while burning organic farm bedding waste is nominal. In addition, since the furnace 10 burns at very high temperatures, there is little or no odor created by the burning fuel.

Figure 14:
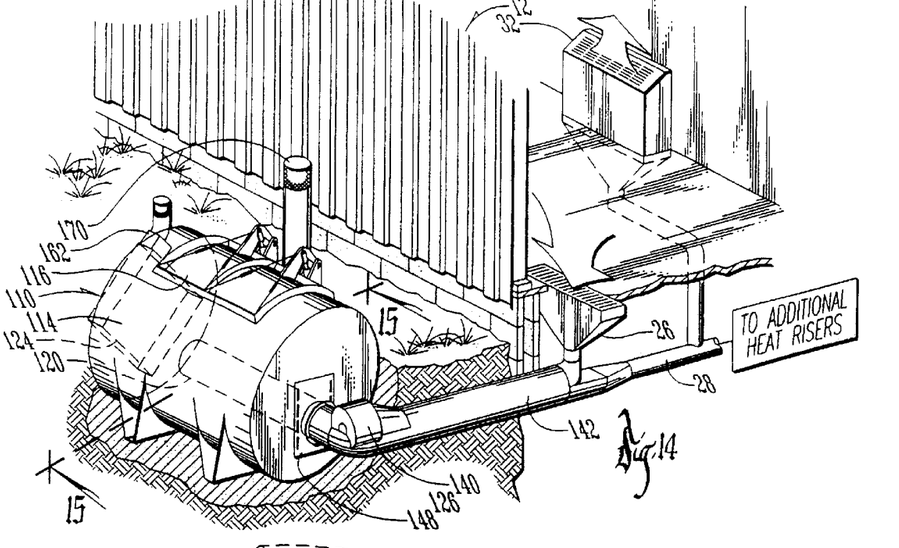
FIG. 14 is a perspective view of an alternate embodiment of the present invention.
Figure 15:
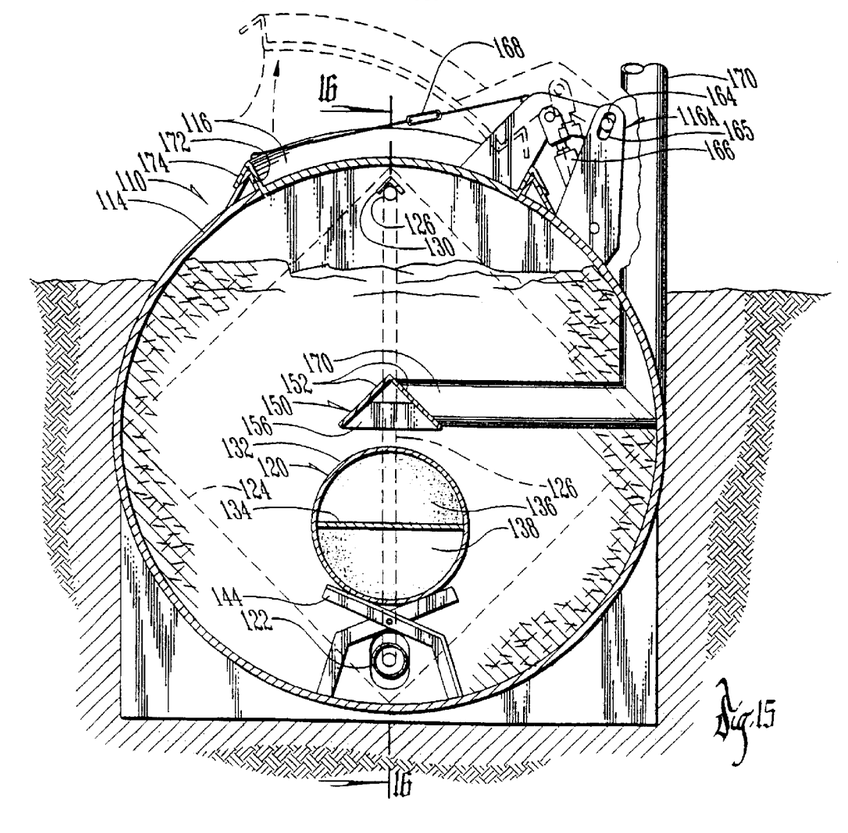
FIG. 15 is a cross section taken along lines 15—15 of FIG. 14.
Figures 16, 17:
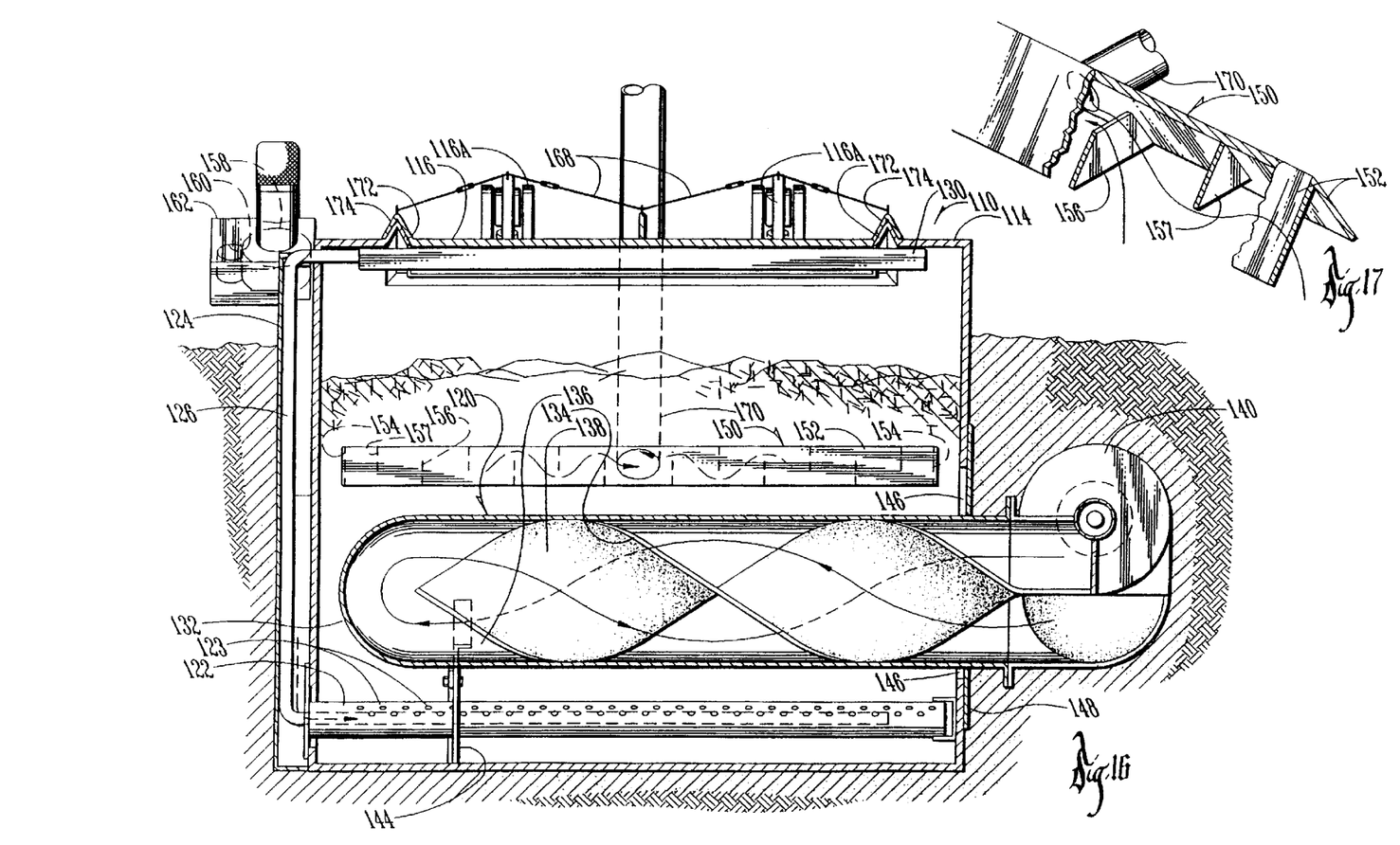
FIG. 16 is a cross section taken along lines 16—16 of FIG. 15.
FIG. 17 is an enlarged partial cross section of the exhaust manifold shown in FIGS. 15 and 16.

FIGS. 14–17 show an alternate embodiment of the present invention. FIG. 14 shows a furnace 110 buried partially in the ground next to the building 12, similar to the furnace 10 shown in FIG. 1. FIGS. 15–17 show the furnace 110 in more detail. Except for the features described below, the furnace 110 is substantially similar to the furnace 10 shown in FIGS. 1–5.

The furnace 110 is shown with the air tube 56 replaced with a rectangular shaped chamber 124. The chamber 124 has a depth approximately equal to the diameter of the air tube 56. The chamber 124 is in communication with an air tube 122 much like the air tube 56 is in communication with the tube 22 (FIG. 5). At the upper portion of the chamber 124, the chamber 124 is in communication with a housing 162 which houses a fan 158 and a motor 160 which drives the fan 158 in the same way as the housing 62, fan 58, and motor 60 do as shown in FIG. 2. By replacing the air tube 56 with the rectangular shaped chamber 124, several advantages are seen. First, the chamber 124 strengthens the firebox 114. In addition, any heat present on the end wall of the firebox 114 will preheat the air before it is injected into the firebox 114 via the air injector pipe 122 and holes 123. This increases the efficiency of the furnace 110.

Another optional feature shown in FIGS. 14–16 is a methane purge pipe 126. As shown in FIG. 16, the methane purge pipe 126 has a first end within the air injector pipe 122 and a second opposite end near the top of the firebox 114. As shown best in FIG. 16, the purge pipe 126 extends through the chamber 124 and the air injector pipe 122, where it terminates near the opposite end of the firebox 114. The portion of the purge pipe 126 located within the injector pipe 122 has serverl orifices or holes (not shown) formed to evenly distribute the methane in the firebox 114 to prevent hot spots on the heat exchanger 120. The purpose of the methane purge pipe 126 is to circulate methane produced by the fuel 18 which collects at the top of the firebox 114 and recirculate it to the bottom of the firebox 114 where it will be burned. This increases the BTU output of the furnace 110 as well as reduces the emission of methane gas into the atmosphere. The methane purge pipe 126 may optionally include a fan (not shown) to more thoroughly circulate air and methane from the top of the firebox 14 to the bottom of the firebox 114. The use of the fan is optional since the natural draft created by the burning of the fuel 18 will draw gas from the top of the firebox 114 through the methane purge pipe 126 to the bottom of the firebox 114. The methane purge pipe 126 may also be in communication with a triangular shaped, downward facing channel 130 disposed along most of the length of the firebox 114. The channel 30 helps to collect methane gas and direct it toward the tube 126. In addition, since the channel is open from the bottom, it will not get clogged. As shown in FIG. 15, the channel 130 is disposed near the middle of the firebox 114. Because of the triangular shape of the channel 130, when the door 116 is opened, fuel can be filled into the firebox 114 around the channel 130. The methane purge pipe 126 could be located at either end of the firebox 114, although the preferred location is swown.

The furnace 110 also includes an improved heat exchanger 120. As shown in FIGS. 14–16, the heat exchanger 120 is comprised of a single cylindrical housing 132 having a spiral shaped flighting 134 disposed within it. Preferably, the spiral or helical flighting 134 is frictionally fit tightly within the housing 132. The spiral flighting 134 divides the housing 132 in two along its length except at the oval-shaped end. In this way, along the length of the heat exchanger 120, two air passageways are formed. The two passageways formed are used as a cold air passageway 136 and a hot air passageway 138. The arrows shown in FIG. 16 show the path of the air as it passes through the cold air passageway 36 and then into the hot air passageway 138. In this way, the hot and cold air are divided by the surfaces of the spiral flighting 134 which helps to heat the cold air with the hot air. Both the cold and hot air are also exposed to the housing 132. The heat exchanger 120 also causes the air to turn as it travels through the heat exchanger 120. The turning action of the air also causes a turbulance and forces a more efficient breakdown of the Laminar layers of heat next to the interior wall of the exchanger. As shown in FIGS. 14 and 16, a fan 140 is disposed at an elbow joint for driving air through the cold air passageway 136 which in turn drives air through the hot air passageway 138. Preferably, a secondary heat exchanger 142 extends from the heat exchanger 120 as shown in FIG. 14. The secondary heat exchanger 142 is very similar to the heat exchanger 120 in that it includes an outer cylindrical housing and a spiral flighting 134 which creates hot and cold passageways which actually extend the cold and hot air passageways 136 and 138 respectively. At the end of the secondary heat exchanger 142, the cold air passageway is in communication with the cold air return 26 while the hot air passageway is in communication with the hot air pipe 28.

Other possible heat exchangers may include coil-type or boiler-type exchangers. For example, one type of exchanger could be comprised of 3 spirals of tubing, one spiral on the outside of the exchanger, one directly inside of the first, and a third near the center of the exchanger. Other types of liquid exchangers may also be used. For example, glycols would be beneficial since the glycols may not boil. Pressurized water may also be used.

The furnace 110 also includes structure which allows the heat exchanger 120 and the air injector pipe 122 to be adjusted vertically. The heat exchanger 120 is supported at one end by an adjustable support 144 which is comprised of two arms pivotally coupled together. By rotating the two arms relative to each other, the height of the heat exchanger 122 can be raised or lowered. The heat exchanger 120 is allowed to slide up and down along an elongated opening 146 shown in FIG. 16. A flat plate 148 is slidably coupled to the firebox 114 and slides up and down with the heat exchanger 120 to seal the opening 146. The air injector pipe 122 can be adjusted up and down in a similar manner as shown best in FIG. 16. By using a heat exchanger 120 and air injector pipe 122 that is adjustable, the height can be adjusted to create an optimal burn which may vary with different types of fuel, etc.

The furnace 110 also includes an optional exhaust manifold 150. The exhaust manifold 150 is elongated and extends across most of the length of the firebox 114 (FIG. 16). The exhaust manifold 150 includes a triangular shaped, downward facing channel 152 which is best shown in FIGS. 15 and 17. The downward facing channel 152 has end caps 154 and a plurality of lower baffles 156 and upper baffles 157 as shown best in FIGS. 16 and 17. The baffles 156 and 157 cause the exhaust gasses to travel in the direction shown by the arrows in FIGS. 16 and 17 which helps to reduce particulate matter exhausting through the chimney 170. The channel 152 is in communication with the chimney 170 at a location preferably near the center of the exhaust manifold 150.

The exhaust manifold 150 allows exhaust gasses to exhaust through the manifold 150 and through the chimney 170 rather than traveling through the fuel 18 in order to exhaust through the chimney such as the chimney 70 shown in FIG. 2. This enhances the development of the cylindrical burn described above. It also helps contain heat within the fuel by keeping hot air in the center of the fuel rather than on top of the fuel. The concept of the exhaust manifold 150 is similar to the concept described above with respect to the chimney 70A which, as described above, includes an intake located slightly above the heat exchanger. Since the exhaust gasses from the burning fuel escape via the exhaust manifold 150 and chimney 170, the air passageways 42 and port holes 44 shown in FIG. 9 can be eliminated. This increases the efficiency of the furnace 110 as well as eliminates any hot spots on the firebox 114. The triangular shape of the channel 152 helps distribute fuel while filling the firebox 114. The exhaust manifold 150 also helps the fuel bridge longer before colapse.

FIGS. 14–16 also show an alternate door 116. The door 116 is hinged to the firebox 114 by the hinge 116A which is comprised of a pin 164 fitted within an elongated hole or slot 165. The door 116 is opened and closed by the use of two hydraulic cylinders 166 which are pivotally coupled to the hinge 116A. To help strengthen the door 116, a set of four turnbuckles 168 are attached between the hinge 116A and the opposite side of the door 116.

To create a satisfactory seal between the firebox 114 and the door 116, the firebox includes triangular shaped protrusions 172 which are disposed all around the opening of the firebox 114 where the door 116 closes. The door 116 has matching triangular shaped indentations 174 which fit matingly to the protrusions 172 when the door 116 is in the closed position. The indentations 174 and the protrusions 172 create a seal between the door 116 and the firebox 114. It is beneficial to have a good seal between the door 116 and the firebox 114 so that air is not allowed to escape which would cause air to move up through the fuel 18 and create the portholes 44 and hot spots.

When the hydraulic cylinders are activated to open the door 116, the pin 164 will be pushed upward through the elongated slot 165 before the entire door 116 starts to pivot and open to the position shown by dashed lines in FIG. 15. When the pin 164 slides upward within the slot 165, the door opens on the side near the hinge 116A first. This breaks the seal formed by the protrusions 172 and indentations 174 and allows the door 116 to be opened without interference by the protrusions 172. In this way, a tight seal can be maintained and the door 116 can be more easily opened. Note that the door 116 opens substantially farther than shown by the dashed lines in FIG. 15. The position of the door 116 shown in dashed lines in FIG. 15 merely shows the door 116 partially opened.

Optionally, to increase the strength of the furnace 110, gussets are included at the ends of the door and at each hinge point around the circumference of the firebox 114.

Another optional feature of the present invention involves the use of augers (not shown) to remove waste material or non-burnable debris such as ash, sand, etc. from the firebox 14 or 114. An open auger could be installed on each side of the air injector pipe 22 or 122 along the length of the pipe. An arced-shaped wall could be positioned against the bottom of the firebox and the air injector pipe to proved a surface for the flighting of the augers to push against and remove waste material from the firebox. Optionally, the waste could be moved to a storage or waste bin.

It has been discovered that various types of fuels can be used with the present invention. Virtually any biomass which can bridge would work well. For example, hogged (chipped) materials, ground materials, or any fibrous materials would work well, even without being mixed with animal waste. Plentiful waste materials such as railroad ties, demolition woods, etc. will work well with the present invention if they are chipped or ground.

It has also been discovered that while using the present invention that a beneficial quenching effect takes place. Cold surfaces can keep combustible gasses below their ignition temperatures. This phenomenon is called quenching. In the furnace of the present invention, the fuel above the exhaust manifold 150, for example, is cool which quenches the steel and keeps the steel cool. As a result, the metals used to make those parts does not need to be as durable as they would need to be if they were hotter.

Another benefit realized with the present invention results from the various voids created in the firebox. For example, positioning the exchanger above the injector pipe creates a full-length pocket along the bottom of the exchanger which helps the orifices 23 open. Similarly, the exhaust manifold 150 creates a void along its length which helps to keep the manifold open. The methane channel 130 creates a similar void. These voids also create places for thermocouples (or limit switches) to be placed.

It has been discovered while operating the furnace of the present invention that the fuel 18 used has several benefits. First, as discussed before, the fuel insulates the center of the firebox very thoroughly. For example, while operating the furnace 10 on a very cold day, temperatures within the firebox 14 can be observed at around 2200 degrees Fahrenheit while ice can still form on the outside walls of the firebox 14. In addition, while moisture in the fuel is an enemy in any prior art system, it can be of some benefit with the present invention. While operating the furnace 10, the moisture present in the fuel will vaporize and condense on the cold walls of the firebox 14 which helps to keep the firebox 14 cool.

It has also been discovered that the hottest temperature observed during the operation of the furnace 10 (as described above) occurs just after the air supply from the air injector pipe 22 is cut off. The radiant heat from the coals of the fuel continue to heat up the heat exchanger without relatively cold air being blown in from the injector pipe 22.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A forced air furnace for burning a fuel comprising: a firebox having a plurality of walls; an air injector disposed within the firebox for injecting air into the firebox; a heat exchanger disposed within the firebox above the air injector, the heat exchanger including an exhaust manifold disposed within the firebox above the heat exchanger; and wherein the fuel to be burned is substantially piled over the air injector and heat exchanger such that the fuel burns from the inside out when air is injected through the air injector.

2. A forced air furnace for burning a fuel comprising: a firebox having a plurality of walls; an air injector disposed within the firebox for injecting air into the firebox; a heat exchanger disposed within the firebox above the air injector; and wherein the fuel to be burned is piled over the air injector and heat exchanger such that the fuel burns from the inside out when air is injected through the air injector; wherein the heat exchanger further comprises: a cylindrical housing; a helical wall disposed within the housing to create a passageway for a fluid to flow from a first end of the housing, to an opposite second end of the housing, and back to the first end of the housing.

* * * * *